United States Patent
Lotfi et al.

(10) Patent No.: US 10,442,659 B2
(45) Date of Patent: Oct. 15, 2019

(54) ELECTROMAGNETIC BRAKE SYSTEM FOR ELEVATOR APPLICATION

(71) Applicant: OTIS ELEVATOR COMPANY, Farmington, CT (US)

(72) Inventors: Amir Lotfi, Redondo Beach, CA (US); Bruce P Swaybill, Farmington, CT (US); James L Hubbard, Kensington, CT (US)

(73) Assignee: Otis Elevator Company, Farmington, CT (US)

( * ) Notice: Subject to any disclaimer, the term of this patent is extended or adjusted under 35 U.S.C. 154(b) by 645 days.

(21) Appl. No.: 15/193,436

(22) Filed: Jun. 27, 2016

(65) Prior Publication Data

US 2016/0376123 A1    Dec. 29, 2016

Related U.S. Application Data

(60) Provisional application No. 62/185,812, filed on Jun. 29, 2015.

(51) Int. Cl.
| | | |
|---|---|---|
| *B66B 1/32* | (2006.01) | |
| *B66D 5/30* | (2006.01) | |
| *B66B 5/02* | (2006.01) | |
| *F16D 55/22* | (2006.01) | |
| *F16D 121/22* | (2012.01) | |

(52) U.S. Cl.
CPC ............. *B66B 1/32* (2013.01); *B66B 5/02* (2013.01); *B66D 5/30* (2013.01); *F16D 55/22* (2013.01); *F16D 2121/22* (2013.01)

(58) Field of Classification Search
CPC ...... B66B 5/02; B66B 1/32; B66D 5/30; F16D 55/22; F16D 2121/22
USPC ....... 187/247, 251, 254, 277, 287, 288, 391, 187/393; 188/71.1, 71.3, 158, 361; 318/434, 362, 365, 370–372
See application file for complete search history.

(56) References Cited

U.S. PATENT DOCUMENTS

| | | | |
|---|---|---|---|
| 2,295,503 | A | 9/1942 | Miller |
| 2,695,697 | A | 11/1954 | Stoeckicht |
| 3,584,710 | A | 6/1971 | Frohlich |
| 4,095,681 | A | 6/1978 | David |
| 4,170,278 | A | 10/1979 | Schubert |
| 4,975,627 | A * | 12/1990 | Reddy ............... B66B 1/32 187/288 |
| 5,153,389 | A | 10/1992 | Nomura |

(Continued)

FOREIGN PATENT DOCUMENTS

| | | |
|---|---|---|
| CN | 2039368 U | 6/1989 |
| CN | 2073963 U | 3/1991 |

(Continued)

OTHER PUBLICATIONS

Dhinese Office action dated Apr. 2, 2018 for corresponding Chinese Patent Application No. 201610489053.3.

(Continued)

*Primary Examiner* — Anthony J Salata
(74) *Attorney, Agent, or Firm* — Bachman & LaPointe, P.C.

(57) ABSTRACT

A brake for an elevator car includes a multiple of sequentially operated brake segments to control a timing and a rate of brake torque for deceleration of the elevator car.

13 Claims, 10 Drawing Sheets

(56) References Cited

U.S. PATENT DOCUMENTS

| | | | | |
|---|---|---|---|---|
| 5,620,063 | A | * | 4/1997 | Smith .................. F16D 55/228 188/240 |
| 6,166,500 | A | * | 12/2000 | Makaran ................ H02M 1/34 318/400.22 |
| 6,631,790 | B2 | | 10/2003 | Mattlar et al. |
| 6,823,969 | B2 | | 11/2004 | Simmonds et al. |
| 7,048,096 | B2 | | 5/2006 | Ozechowski |
| 7,527,127 | B2 | * | 5/2009 | Osterman ............. B66B 5/0031 187/288 |
| 7,669,697 | B2 | * | 3/2010 | Ueda ........................ B66B 5/02 187/292 |
| 7,730,998 | B2 | * | 6/2010 | Takahashi ................ B66B 1/32 187/287 |
| 7,740,110 | B2 | * | 6/2010 | Kattainen ................ B66B 1/32 187/288 |
| 3,016,081 | A1 | | 9/2011 | Weinberger et al. |
| 8,167,094 | B2 | * | 5/2012 | Ueda .................... B66B 5/0031 187/288 |
| 8,365,872 | B2 | * | 2/2013 | Ueda ........................ B66B 5/04 187/248 |
| 8,783,423 | B2 | * | 7/2014 | Schrewe ................ F16D 65/18 188/72.5 |
| 9,587,690 | B2 | * | 3/2017 | Boffelli ................ F16D 65/121 |
| 9,873,591 | B2 | * | 1/2018 | Kattainen ................ B66B 1/32 |
| 2006/0260886 | A1 | * | 11/2006 | Erlston .................. F16D 55/50 188/71.5 |
| 2012/0073909 | A1 | * | 3/2012 | Kondo ..................... B66B 1/32 187/247 |
| 2012/0193172 | A1 | * | 8/2012 | Matscheko .............. B60L 7/00 187/289 |
| 2013/0313052 | A1 | * | 11/2013 | Della Porta ............... B66B 1/32 187/288 |
| 2014/0262657 | A1 | | 9/2014 | Boonpongmanee |
| 2017/0029243 | A1 | | 2/2017 | Lotfi et al. |
| 2017/0073184 | A1 | * | 3/2017 | Lotfi ........................ B66D 5/14 |
| 2017/0363163 | A1 | | 12/2017 | Sanchez Criado et al. |

FOREIGN PATENT DOCUMENTS

| | | |
|---|---|---|
| CN | 1060342 A | 4/1992 |
| CN | 101044081 A | 9/2007 |
| CN | 106276477 A | 1/2017 |
| CN | 107110260 A | 8/2017 |
| DE | 8005138 U1 | 11/1980 |
| DE | 10128846 A1 | 1/2003 |
| DE | 20206022 U1 | 8/2003 |
| DE | 102006043999 A1 | 4/2008 |
| EP | 1334946 A1 | 8/2003 |
| EP | 1568645 A1 | 8/2005 |
| EP | 1918239 A1 | 5/2008 |
| EP | 2138441 A1 | 12/2009 |
| EP | 2474753 A2 | 7/2012 |
| FR | 550133 A | 2/1923 |
| GB | 582529 A | 11/1946 |
| GB | 703917 A | 2/1954 |
| JP | H03121238 U | 12/1991 |
| JP | H0725470 A | 1/1995 |
| JP | H0725470 U | 5/1995 |
| RU | 2455540 C2 | 8/2009 |
| WO | 2014198545 A1 | 12/2014 |
| WO | 2016110329 A1 | 7/2016 |

OTHER PUBLICATIONS

European Search Report dated Oct. 31, 2016 for European Application No. 16176961.7.

Chinese Office action dated Nov. 1, 2018 for corresponding Chinese Patent Application No. 201610489053.3.

\* cited by examiner

| PARAMETERS | VARIABLE NAMES | VALUE | UNIT |
|---|---|---|---|
| EMPTY CAR | EC | 1000 | kg |
| LOAD | DUTY | 2000 | kg |
| OVERBALANCE | OB | 0.50 | - |

| COUNTERWEIGHT | CW=EC+OB.DUTY | 2000 | kg |
|---|---|---|---|
| FULL CAR IMBALANCE LOAD | imb_f=(1-OB).DUTY | 1000 | kg |
| 125% LOAD IMBALANCE | imb_125=(1.25-OB).DUTY | 1500 | kg |

| CODE REQUIREMENT 1 | STOP 125% IMBALANCE LOAD WITH ALL THE SEGMENTS. | | |
|---|---|---|---|
| TOTAL BRAKE TORQUE REQUIREMENT/RADIUS | TORQUE_F/R=imb_125 | 1500 | kg |

| CODE REQUIREMENT 2 | STOP FULL LOAD WITH N-1 SEGMENTS. | | |
|---|---|---|---|
| N-1 SEGMENT TORQUE REQUIREMENT/RADIUS | TORQUE_N_1/R=imb_125 | 1000 | kg |

40 →

| #SEGMENTS | REQ'D TORQUE ON EACH SEGMENT/R USING CODE REQ'T 1 =(TORQUE_F)/R/(#SEGMENTS) | REQ'D TORQUE ON EACH SEGMENT/R USING CODE REQ'T 2 =(TORQUE_N_1)/R/(#SEGMENTS-1) | TOTAL BRAKE TORQUE/R =MAX(REQ1,REQ2)*(#SEGMENT) |
|---|---|---|---|
| 2 | 750 | 1000 | 2000 |
| 3 | 500 | 500 | 1500 |
| 4 | 375 | 333 | 1500 |
| 5 | 300 | 250 | 1500 |

FIG. 5

FAST COIL

ADJUSTABLE SPEED

SLOW COIL

ULTRA SLOW COIL

ULTRA SLOW COIL

ELECTROMAGNETIC BRAKE SYSTEM FOR ELEVATOR APPLICATION

CROSS REFERENCE TO RELATED APPLICATION

This application claims the benefit of provisional application Ser. No. 62/185,812, filed Jun. 29, 2015.

BACKGROUND

The present disclosure relates to an elevator system and, more particularly, to elevator systems equipped with an electromagnetic brake system.

In emergency stop (E-stop) operation such as during power interruptions, engagement of an electromagnetic brake system may result in passenger discomfort due to the abrupt deceleration. This may be particularly noticeable in a downward travelling elevator car, with the car being lighter than the counterweight (motoring run), when the brake forces and gravitational forces are in the same direction. Regulatory bodies have restricted the performance of electromagnetic brake systems to address these conditions.

In conventional roped elevator systems, the rate of deceleration is relatively low due to the relatively heavier cars, counterweights, and resultant drive machine inertia. In relatively more recent elevator systems, the elevator cars are much lighter and the overall system inertia is lower, which contributes to relatively higher rates of deceleration during an emergency stop event. This relatively high rate of deceleration may also result in belt slippage, which may be unacceptable under certain regulatory regimes.

SUMMARY

A brake system for an elevator car according to one disclosed non-limiting embodiment of the present disclosure can include a multiple of sequentially operated brake segments to control a timing and a rate of brake torque for deceleration of the elevator car, wherein the multiple of sequentially operated brake segments include at least three brake segments.

A further embodiment of the present disclosure may include, wherein the multiple of sequentially operated brake segments includes only three brake segments.

A further embodiment of any of the embodiments of the present disclosure may include, wherein each of the multiple of sequentially operated brake segments includes an electromagnetic coil that controls the timing and the rate of brake torque for that brake segment.

A further embodiment of any of the embodiments of the present disclosure may include, wherein each of the electromagnetic coils operates to control a respective brake caliper.

A further embodiment of any of the embodiments of the present disclosure may include, wherein each of the respective brake calipers interacts with a respective brake disc.

A further embodiment of any of the embodiments of the present disclosure may include, wherein each of the multiple of sequentially operated brake segments are concentrically arranged within a common plane.

A further embodiment of any of the embodiments of the present disclosure may include, wherein each of the multiple of sequentially operated brake segments are circumferentially arranged.

A further embodiment of any of the embodiments of the present disclosure may include, wherein each of the multiple of sequentially operated brake segments are axially arranged.

A further embodiment of any of the embodiments of the present disclosure may include, wherein the multiple of sequentially operated brake segments is operable to stop 125% of a rated load of the elevator car.

A further embodiment of any of the embodiments of the present disclosure may include, wherein an N−1 number of the multiple of sequentially operated brake segments, is operable to stop 100% of the rated load of the elevator car wherein N is the total number of brake segments.

A further embodiment of any of the embodiments of the present disclosure may include, wherein the multiple of sequentially operated brake segments include at least three brake segments.

A brake system for an elevator car according to another disclosed non-limiting embodiment of the present disclosure can include a first brake segment; a second brake segment sequentially operable subsequent to the first brake segment; and a third brake segment sequentially operable subsequent to the second brake segment, the sequential operation of the first, second, and the third brake segment operable to control a timing and a rate of brake torque for deceleration of the elevator car.

A further embodiment of any of the embodiments of the present disclosure may include, wherein the first, the second, and the third brake segment each include an electromagnetic coil operates to control a respective brake caliper on a respective brake disc.

A further embodiment of any of the embodiments of the present disclosure may include, wherein the first, the second, and the third brake segment each include an electromagnetic coil operates to control a respective brake caliper on a single brake disc.

A further embodiment of any of the embodiments of the present disclosure may include, wherein the first, the second, and the third brake segment are sequentially operated to stop 125% of a rated load of the elevator car.

A further embodiment of any of the embodiments of the present disclosure may include, wherein two of the first, the second, and the third brake segments are operable to stop 100% of the load of the elevator car.

A method of engaging an electromagnetic brake for an elevator system according to another disclosed non-limiting embodiment of the present disclosure can include sequentially controlling a multiple of brake segments to control a timing and a rate of brake torque for deceleration of the elevator car.

A further embodiment of any of the embodiments of the present disclosure may include, wherein the multiple of brake segments are sequentially operated to stop 125% of a rated load of the elevator car.

A further embodiment of any of the embodiments of the present disclosure may include sequentially operating the multiple of brake segments as a first, a second, and a third brake segment.

A further embodiment of any of the embodiments of the present disclosure may include sequentially operating the multiple of brake with respect to a single brake disc.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 is a chart illustrating relationships for example electromagnetic brake systems with multiple segments;

DETAILED DESCRIPTION

Figure 1:
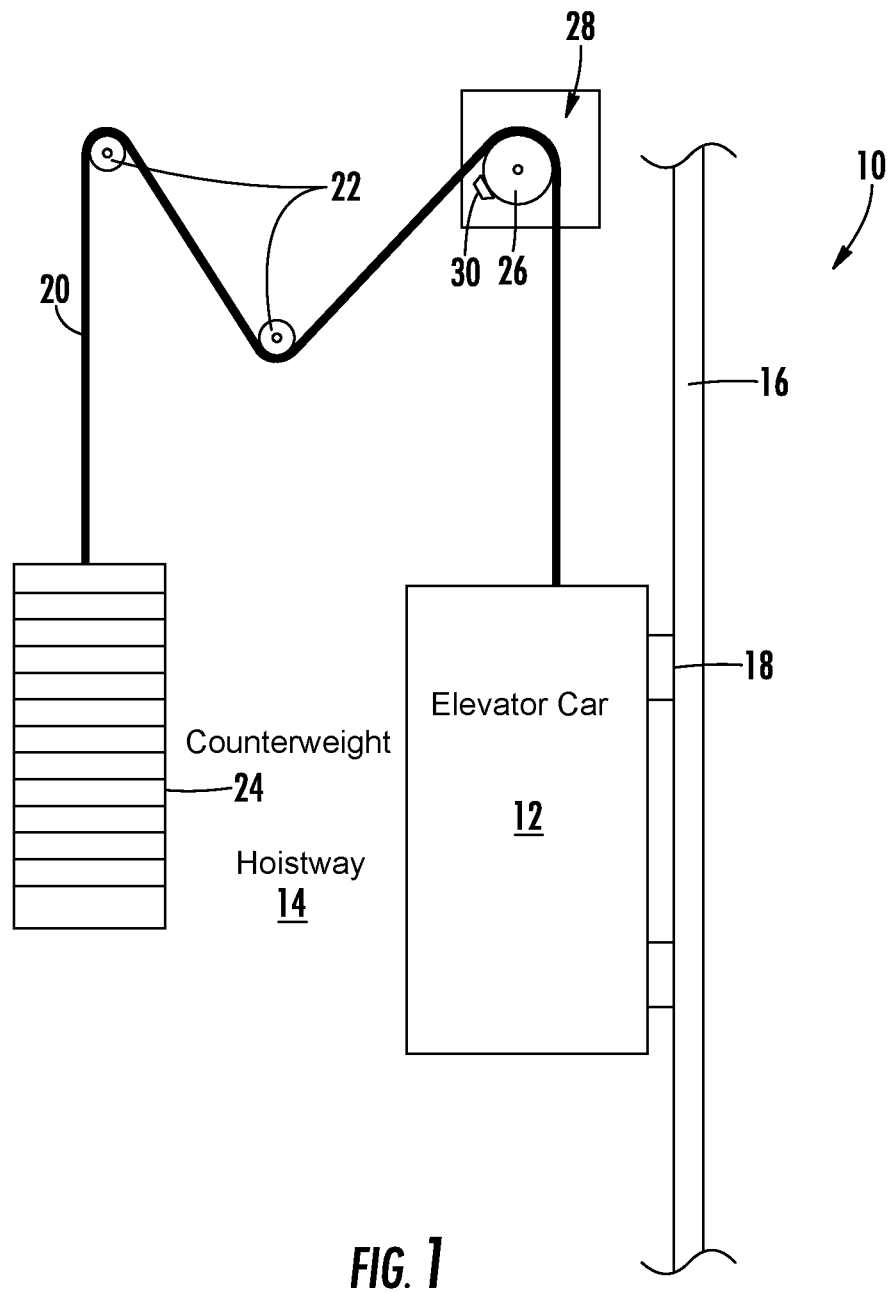
FIG. 1 is a schematic view of an embodiment of an elevator system according to one disclosed non-limiting embodiment.

FIG. 1 schematically illustrates an elevator system 10. The elevator system 10 includes an elevator car 12 located in a hoistway 14. The hoistway 14 includes one or more guide rails 16 interactive with one or more guide shoes 18 of the elevator car 12 to guide the elevator car 12 along the hoistway 14. A suspension member 20, typically a rope and/or a belt, suspends the elevator car 12 in the hoistway 14. It should be appreciated that although particular systems are separately defined, each or any of the systems can include otherwise combined or separated via hardware and/or software. It should also be appreciated that although one suspension member 20 is shown, multiple suspension members 20 may be utilized. The suspension member 20 is routed over one or more sheaves 22 thence to a counterweight 24 which may also be disposed in the hoistway 14. One or more of the sheaves may be a drive sheave 26, operably connected to a machine 28 to control the elevator car 12 along the hoistway 14.

The elevator system 10 includes a brake system 30 disposed, in one embodiment, at the drive sheave 26 to halt rotation of the drive sheave 26 and thus stop movement of the elevator car 12 in response to certain select conditions such as a power failure to the elevator system 10 or other emergency stop (E-stop) situations. While in the described embodiments the brake system 30 is disposed at the drive sheave 26, it is to be appreciated that in other embodiments the brake system 30 may be located at the elevator car 12 and is configured to engage the guide rail 16 thus stopping motion of the elevator car 12 in the hoistway 14.

In this embodiment, the brake system 30 is an electromagnetic brake that is normally in an open position when supplied with electrical power and the electromagnetic coils thereof are energized. This open position permits free travel of the elevator car 12. When, however, the supply of electrical power to the electromagnetic coils ceases, the brake system 30 engages and safely stops the elevator car 12. In typical elevator systems 10, the electromagnetic brake system 30 quickly stops the elevator car 12, but such rapid deceleration of the elevator car 12 may result in passenger discomfort.

Figure 2:
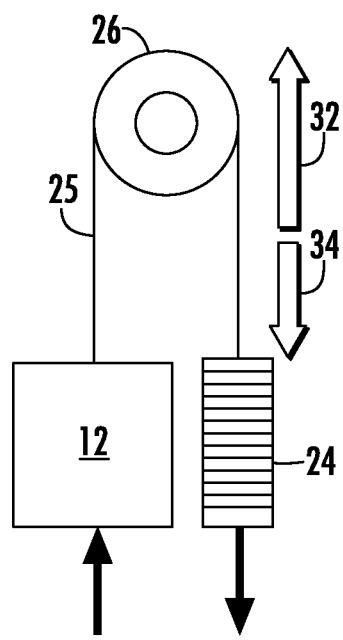
FIG. 2 is a schematic view of forces acting on an embodiment of an elevator system under a regenerating run.
Figure 3:
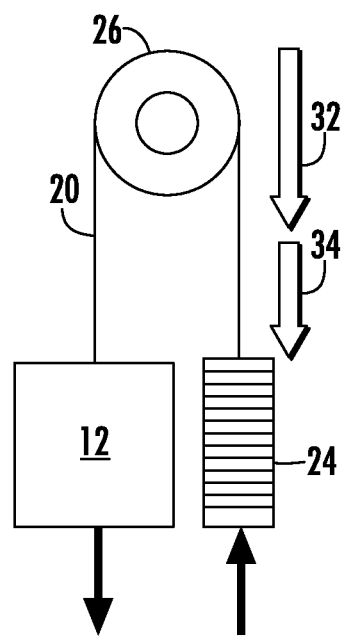
FIG. 3 is a schematic view of forces acting on an embodiment of an elevator system under a motoring run.

With reference to FIGS. 2 and 3, two cases during operation of the elevator system 10 where the brake 30 may be applied to stop the elevator car 12 are schematically illustrated. FIG. 2 schematically illustrates the case where the elevator car 12 is lighter than the counterweight and is travelling upward. In this case, when the brake system 30 is applied, a brake friction force 32 and a gravity force 34 are in opposite directions. This has the effect of lowering a deceleration rate of the elevator car 12. FIG. 3 schematically illustrates the case where the elevator car 12 is lighter than the counterweight and is travelling downward when the brake system 30 is applied. In this case, the brake friction force 32 and the gravity force 34 are in the same direction, effectively increasing the deceleration rate of the elevator car 12 once the brake system 30 is applied. In this case it may be desirable to delay application of full brake torque by, in some embodiments, several hundred milliseconds, and soften the application of full brake torque to reduce the deceleration rate of the elevator car 12. This also facilitates reduction of the potential for slippage of the suspension member 20.

Figure 4:
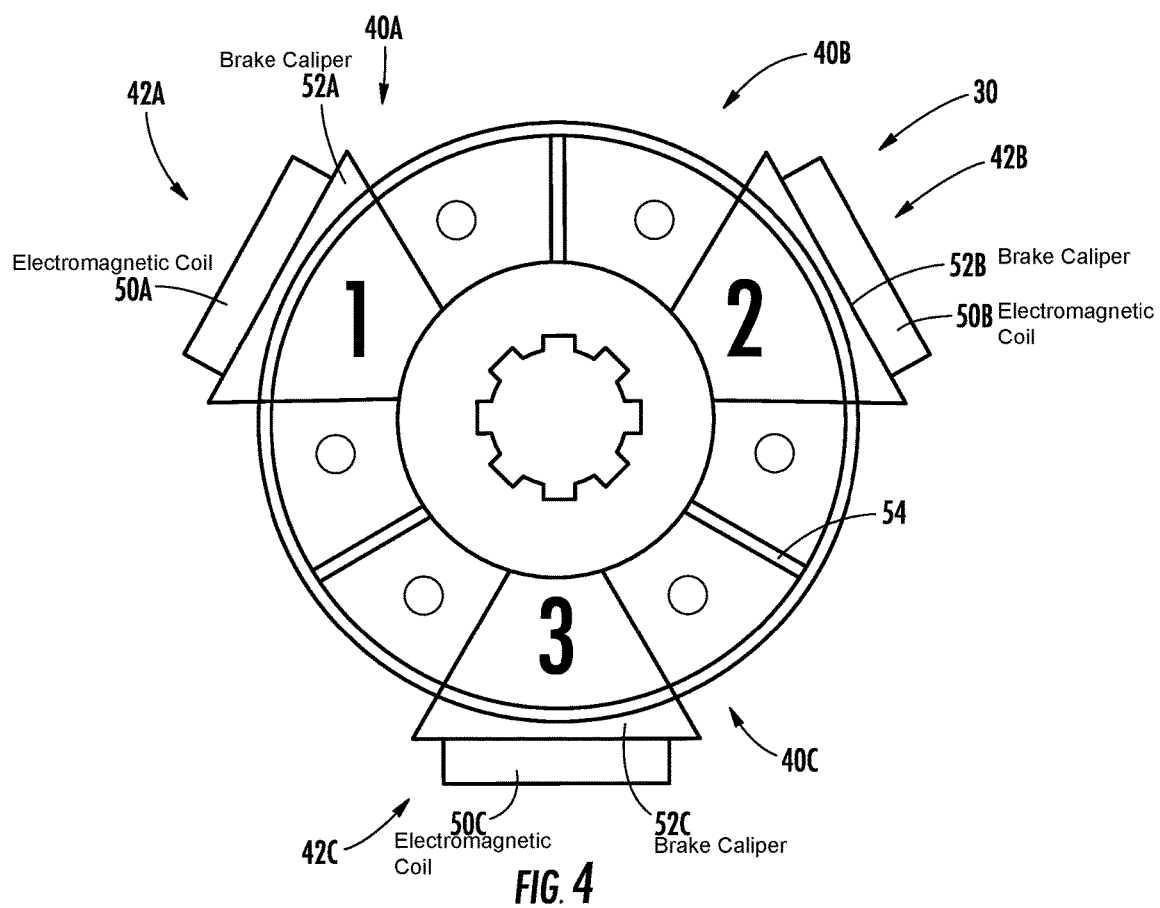
FIG. 4 is a schematic view of an electromagnetic brake for an elevator system.

With reference to FIGS. 4-5, certain regulatory regimes may require electro-mechanical brakes to meet the following code requirements:

1—The brake system shall stop the car traveling down with 125% load; and

2—All mechanical components of the brake shall be installed in at least two sets such that if one set fails (N−1), the remainder shall stop and hold the car traveling down with 100% load.

In one embodiment, the brake system 30 includes a multiple of sequentially operated brake segments 40a-40c (three segments shown in this example). Each brake segment 40a-40c is separately operable and designed in relationship to the other brake segments to meet the desired code requirements. The multiple of sequentially operated brake segments 40a-40c facilitate emergency stop performance by increasing the time of which the code required brake torque is applied which, as a result, the deceleration of an E-stop is smoother and more controlled which is particularly advantageous in territories with frequent power interruptions.

In one example elevator system 10, an empty car weighs 1000 kg with a duty load of 2000 kg and a counterweight that weighs 2000 kg at a 0.5 overbalance. This results in a potential full car imbalance load of 1000 kg and a code requirement of 1500 kg for the 125% load and 1000 kg load stop for N−1 segments (FIG. 5). In this example, each brake segment 40a, 40b, 40c of a 3-segment brake accommodates 500 kg to meet code requirement 1 of 1500 kg. That is, operation of all brake segments 40a, 40b, 40c stop 125% rated load (1500 kg) to meet code requirement 1, while operation of N−1 segments 40a, 40b stop 100% load (1000 kg) to meet code requirement 2. This essentially softens the application of full brake torque to reduce the deceleration rate of the elevator car 12. This advantageously compares to a two-segment brake in which each of the two segments must provide 100% of the rated load (1000 kg) to meet code requirement 2 and thus results in a total brake torque of 2000 kg when both segments are operational. In other words, code requirement 2 for a two-segment brake results in a relatively high rate of deceleration during an emergency stop event when both segments are properly operational—which is typical. Notably, for a 4-segment and 5-segment brake, code requirement 1 necessarily controls to meet the 125% rated load requirement (1500 kg) (FIG. 5).

With continued reference to FIG. 4, each of the multiple of sequentially operated brake segments 40a-40c includes a separately operable electromagnetic coil 50a-50n that drives an associated brake caliper 52a-52c to control the timing and rate of the brake torque applied to a single brake disc 54. That is, each brake caliper 52a-52c is non-circular and interacts with a respective sector of the single brake disc 54. Each electromagnetic coil 50a-50c may be oval, curved, bean-shaped, circular, etc., and operates to control its respective brake caliper 52a-52c.

Figure 6:
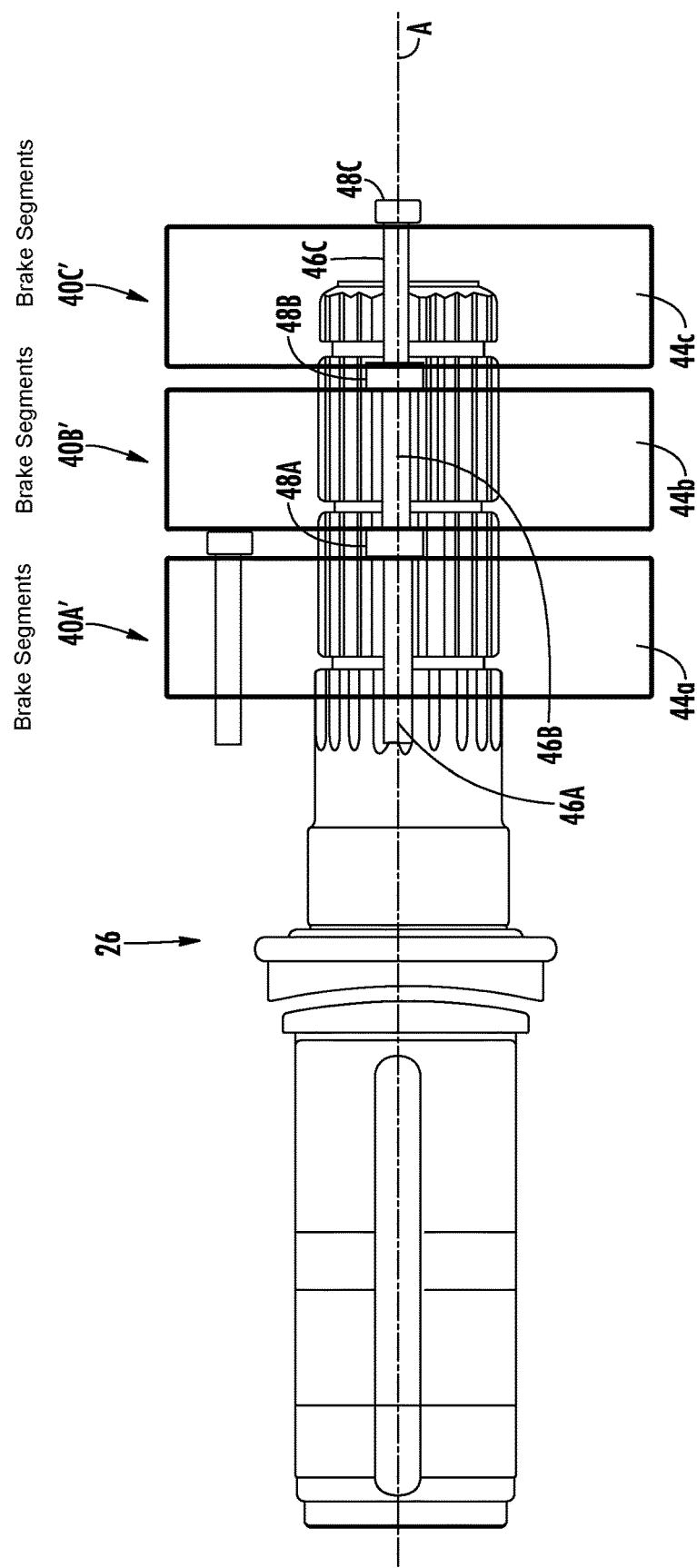
FIG. 6 is a schematic view of another embodiment of an electromagnetic brake for an elevator system.

With reference to FIG. 6, each of the multiple of sequentially operated brake segments 40a-40c (three segments shown in this example) may alternatively include separate brake subsystems 42a-42c. Each separate brake subsystems 42a-42c include a brake disc 44a-44c, an electromagnetic coil 46a-46c, and an associated brake caliper 48a-48c. That is, each brake subsystems 42a-42c is self contained and separately mounted along an axis A on the drive sheave 26.

Figure 7:
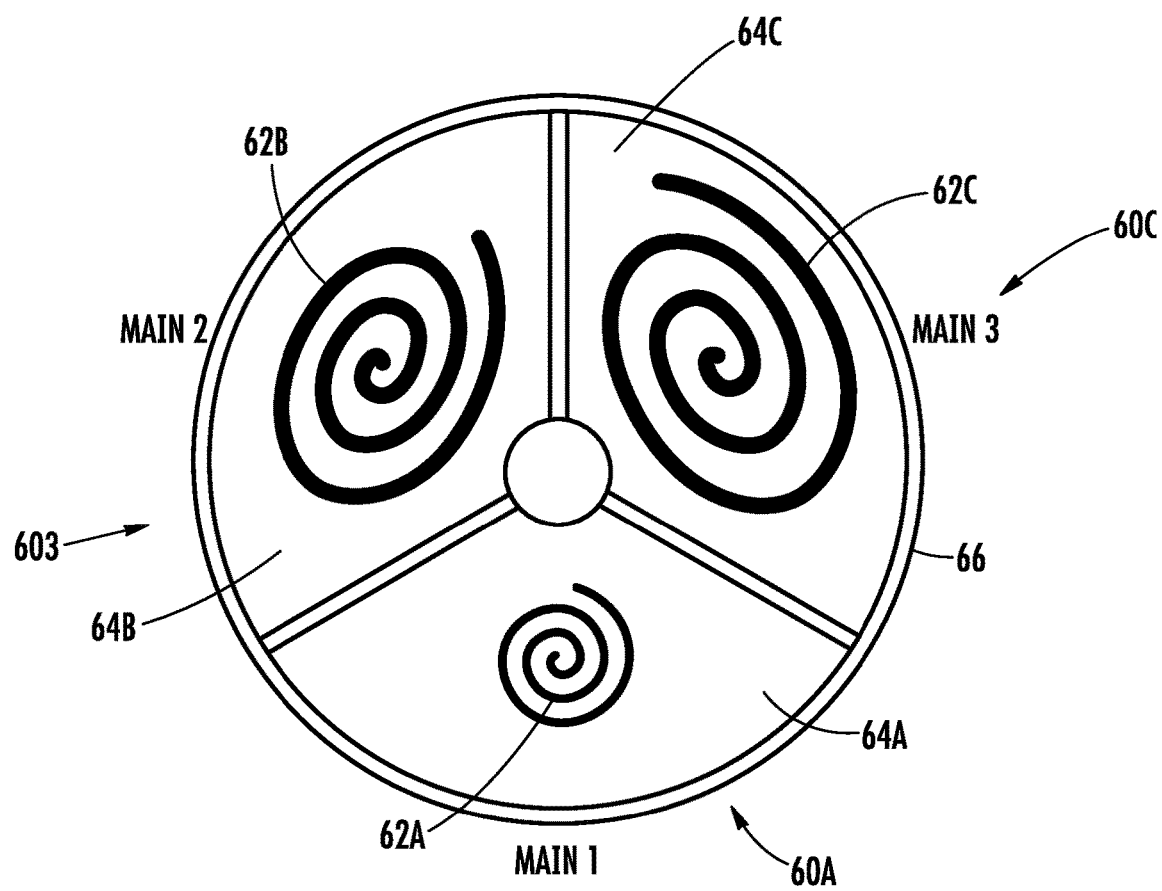
FIG. 7 is a schematic view of still another electromagnetic brake embodiment of a braking system for an elevator system.

With reference to FIG. 7, another embodiment of the brake system 30 includes three sequentially operated brake segments 60a-60c that each include a separately operable electromagnetic coil 62a-62c (illustrated schematically) that drives an associated brake caliper 64a-64c to control the timing and rate of the brake torque applied to a single brake disc 66. In this embodiment, each brake segment 60a-60c is about equivalent in size, while each electromagnetic coil 62a-62c is different so as to vary the response time of the three sequentially operated brake segments 60a-60c. That is, each brake segments 60a-60c applies about equal brake torque but is released at a different time from the emergency stop (E-stop) initiation. The difference in the electromagnetic coil 62a-62c may be achieved by, for example, different characteristics in the coil design such as a number of coil turns, coil diameter, coil material, coil size, gap size, brake voltages, plate/housing materials, and/or combinations thereof. It should be appreciated that various characteristics may be defined to differentiate operation of the electromagnetic coil 62a-62c.

In this embodiment, the first brake segment 60a drops relatively rapidly which almost immediately results in the rapid application of about ⅓ of the total brake torque. This rapid application of about ⅓ of the total brake torque prevents an over-speed condition (FIG. 7). Then, the second and third electromagnetic coils 62b, 62c are sized to sequentially release the associated brake segments 60b, 60c to complete a relatively smooth stop.

Figure 8:
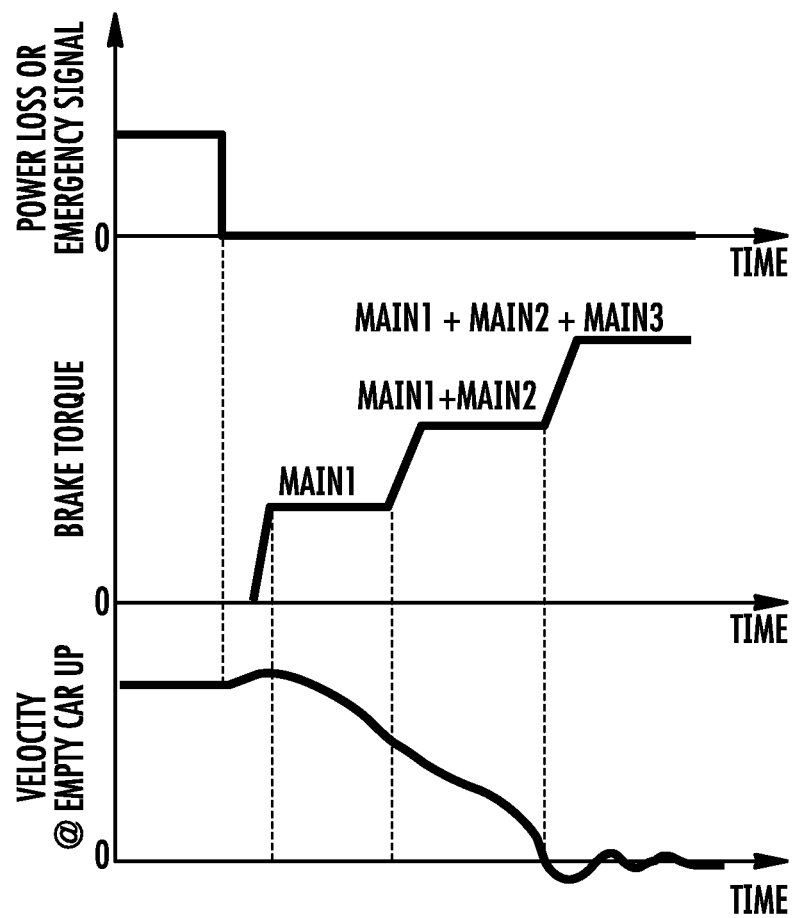
FIG. 8 is a graphical representation of example operational values for the FIG. 7 braking system.

With reference to FIG. 8, upon initiation of an emergency stop (E-stop) operation, the first brake segment 60a rapidly releases to prevent over-speed. Notably, the velocity of the elevator car 12 slightly increases but an over speed condition does not occur due to the rapid drop off of the first electromagnetic coil 62a. Then, the second and third electromagnetic coils 62b, 62c drop sequentially thereafter to extend the brake activation time to achieve a relatively smooth stop. This sequential operation facilitates passive reduction to otherwise relatively harsh E-stops, complies with elevator codes, and requires no supplemental external power.

Figure 9:
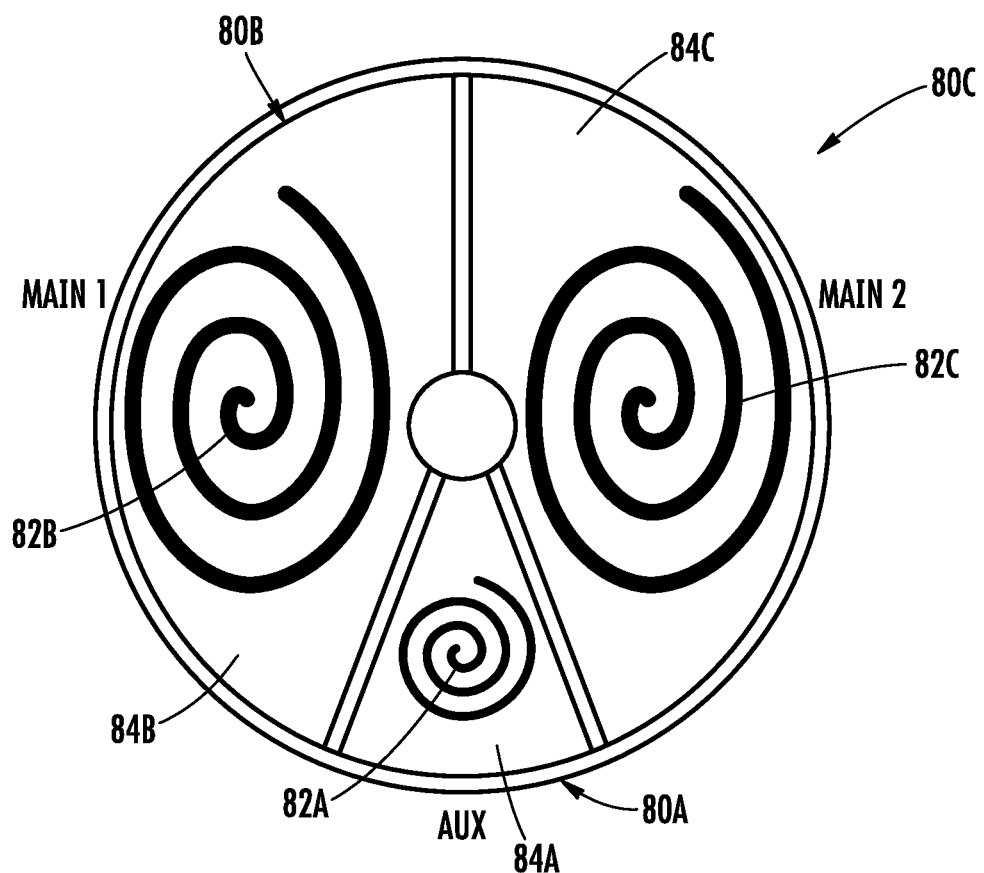
FIG. 9 is a schematic view of still another electromagnetic brake embodiment of a braking system for an elevator system.

With reference to FIG. 9, another embodiment of the brake system 30 includes an auxiliary brake segment 80a and two main brake segments 80b, 80c that each include a separately operable electromagnetic coil 82a-82c and an associated brake caliper 84a-84c to control the timing and rate of the brake torque application to a single brake disc 86. In this embodiment, the auxiliary brake segment 80a is significantly smaller than that of the main brake segments 80b, 80c. In this example, the auxiliary brake segment 80a is an about 30 degree segment, and each of the main brake segment 80b, 80c are about 115 degrees. The auxiliary brake segment 80a may be sized just large enough to prevent an over speed condition.

The over speed condition in one example is about 15% of a nominal e.g. 1 meter per second nominal speed.

Figure 10:
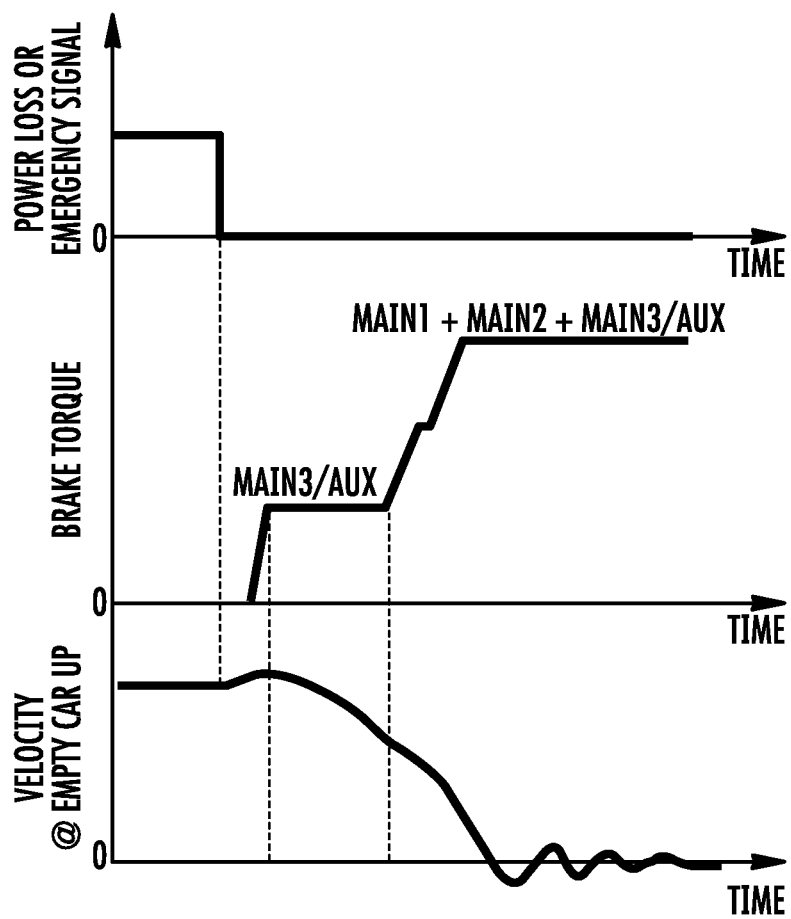
FIG. 10 is a graphical representation of example operational values for the FIG. 9 braking system.

With reference to FIG. 10, upon initiation of an emergency stop (E-stop) operation, the auxiliary brake segment 80a relatively rapidly applies a brake torque sufficient to prevent over-speed. Notably, the velocity of the elevator car 12 may slightly increase but an over speed issue does not occur due to the rapid application of the auxiliary brake segment 80a. Then, the second and third brake segments 80b, 80c drop essentially simultaneously thereafter to achieve a relatively smooth stop as compared to a conventional E-stop. This operation addresses local code challenges to a sequential brake drop (FIGS. 7 and 8) yet still facilitates passive reduction to otherwise relatively harsh E-stops.

Figure 11:
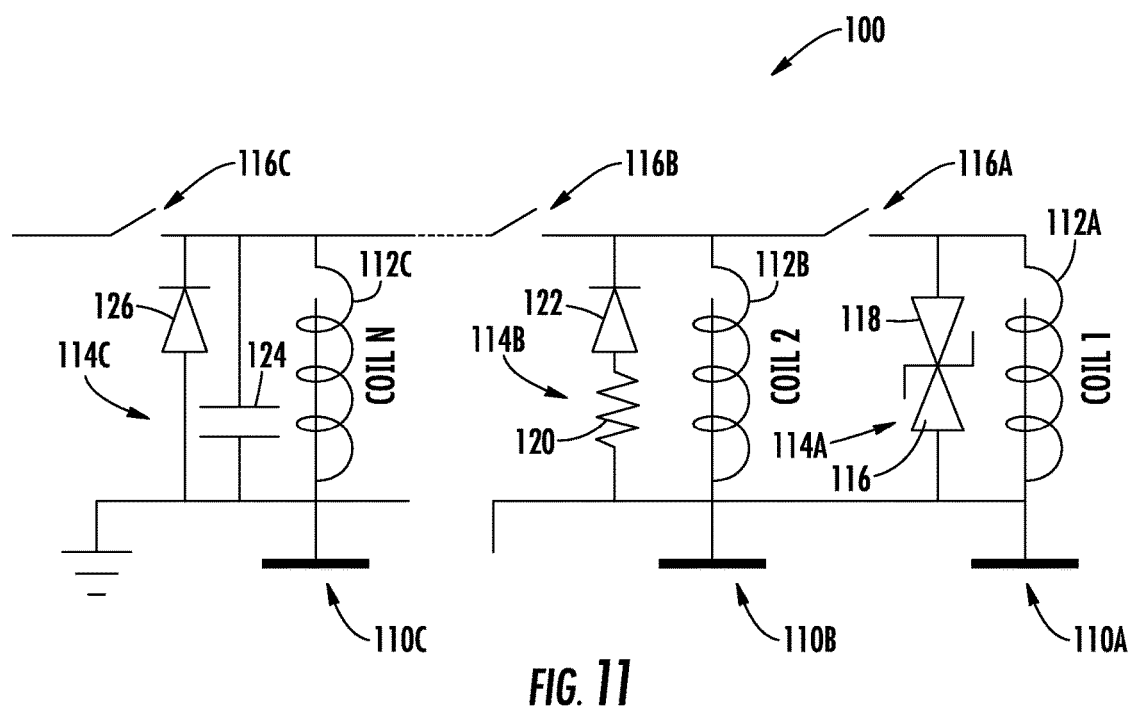
FIG. 11 is a schematic diagram of a braking control circuit for an elevator system.
Figure 12:
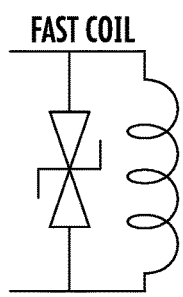
FIG. 12-16 are schematic diagrams of a portion of alternate braking control circuits for an elevator system.
Figure 13:
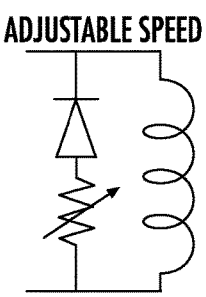
Figure 14:
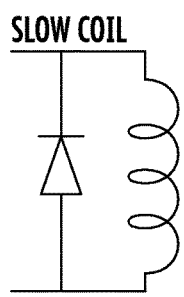
Figure 15:
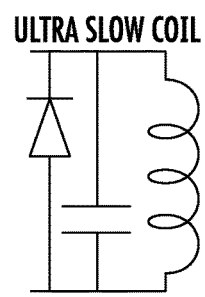

With reference to FIG. 11, another embodiment of the brake system 30 includes a brake control circuit 100 to control operation of each of a multiple of brake segments 110a-110c (three segments shown in this example) of the brake system 30 and thereby passively sequence the brake drop of each brake segment 110a-110c to slow the deceleration rate in an E-stop event. Various regulatory agencies require electromechanical brake systems to become effective without supplementary delay after opening the brake release circuit. Diode and capacitor elements are not considered by the regulatory agencies to constitute a supplemental delay.

The brake control circuit 100 includes an electromagnetic coil 112a-112c, a snubber network 114a-114c, and a latching relay 116a-116c for each respective brake segment 110a-110c. It should be appreciated that although three segments are illustrated in this example, any number of segments will benefit herefrom.

The snubber networks 114a-114c are electrically arranged so that the electromagnetic coils 112a-112c are sequenced in time to slow a deceleration rate for an E-stop event. For example, the snubber network 114a may include a surge absorbing component 116, such a Zener diode, a Metal Oxide Varistor (MOV) a Transorb, or other component, in series with another diode 118 for relatively fast operation for the electromagnetic coil 112a of the brake segment 110a; the snubber network 114b may be a resistor 120 in series with a diode 122 for the next sequential operation of the second electromagnetic coil 112b of the second brake segment 110b; and the snubber network 114c may include a capacitor 124 in parallel with a diode 126 for the next sequential operation of the third electromagnetic coil 112c of the third brake segment 110c.

Upon initiation of an E-stop operation after loss of power, the snubber network 114a minimally prolongs current flow for relatively fast operation of the electromagnetic coil 112a of the brake segment 110a. The brake segment 110a thereby readily rapidly applies a brake torque sufficient to prevent over-speed. Then, the second and third electromagnetic coils 112b, 112c drop in accordance with the brake drop time provided by the respective snubber networks 114b, 114c, to complete a relatively smooth E-stop. This operation addresses local code challenges of a sequential brake drop yet still facilitates passive reduction to otherwise relatively harsh E-stops.

Figure 16:
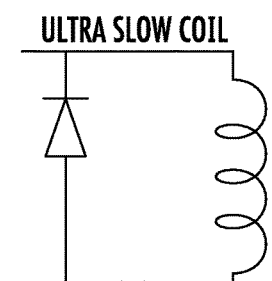

It should be appreciated that the snubber networks 114ab, 114c may be readily defined to provide the desired response for each brake segment 110a-110c. Alternative embodiments of the snubber networks are schematically illustrated in FIGS. 12-16 to provide a range of brake drop times such as a relatively fast Zener diode snubber network arrangement (FIG. 12); an adjustable speed snubber network arrangement with a variable resistor (FIG. 13); a slow snubber network arrangement (FIG. 14); an ultra slow snubber network arrangement with a capacitor and diode in parallel (FIG. 15); and an ultra slow snubber network arrangement with a diode and a coil or inductor in series (FIG. 16). It should be appreciated that various snubber networks, and various combinations thereof may be utilized to control the actuation sequence of each brake segment 110a-110c.

The latching relay 116a-116c of each brake segment 110a-110c may be simultaneously closed in an E-stop event such that a sequential brake drop of all brake segments occurs. Alternatively, only one or more the latching relay 116a-116c are closed such that the particular latching relay 116a-116c are set to a selected position at a beginning of an elevator car 12 run, based on, for example, a direction of elevator car 12 travel such as regen or motoring, and/or load imbalance between the elevator car 12 and the counterweight 24. That is, only particular brake segments 110a-110c may be set for a particular elevator run. While the latching relays 116a-116c are illustrated and described herein, it is to be appreciated that other switching mechanisms may be utilized in the brake control circuit 100. For example, in other embodiments a normal, non-latching relay or an electronic switch such as a mofset may be used. Further, an additional relay may be utilized in conjunction with the mofset to "latch" the mofset. This operation addresses local code challenges of a sequential brake drop yet still facilitates passive reduction to otherwise relatively harsh E-stops.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A brake system for an elevator car comprising:
a multiple of sequentially operated brake segments to control a timing and a rate of brake torque for deceleration of the elevator car upon initiation of an E-stop operation after loss of power, wherein the multiple of sequentially operated brake segments include at least three brake segments, wherein each of the multiple of sequentially operated brake segments includes an electromagnetic coil that controls the timing and the rate of brake torque for that brake segment, the multiple of sequentially operated brake segments operable to stop 125% of a rated load of the elevator car, an N−1 number of the multiple of sequentially operated brake segments operable to stop 100% of the rated load of the elevator car wherein N is the total number of brake segments.

2. The system as recited in claim 1, wherein the multiple of sequentially operated brake segments includes only three brake segments.

3. The system as recited in claim 1, wherein each of the multiple of sequentially operated brake segments includes an electromagnetic coil that controls the timing and the rate of brake torque for that brake segment.

4. The system as recited in claim 1, wherein each of the electromagnetic coils operates to control a respective brake caliper.

5. The system as recited in claim 4, wherein each of the respective brake calipers interacts with a respective brake disc.

6. The system as recited in claim 1, wherein each of the multiple of sequentially operated brake segments are concentrically arranged within a common plane.

7. The system as recited in claim 1, wherein each of the multiple of sequentially operated brake segments are circumferentially arranged.

8. The system as recited in claim 1, wherein each of the multiple of sequentially operated brake segments are axially arranged.

9. The system as recited in claim 1, wherein the multiple of sequentially operated brake segments include at least three brake segments.

10. A brake system for an elevator car comprising:
a first brake segment comprising an electromagnetic coil operates to control a respective brake caliper on a single brake disc, the first brake segment operable to apply a brake torque sufficient to prevent over-speed;
a second brake segment comprising an electromagnetic coil operates to control a respective brake caliper on a single brake disc, said second brake segment sequentially operable subsequent to the first brake segment; and a third brake segment comprising an electromagnetic coil operates to control a respective brake caliper on a single brake disc, said third brake segment sequentially operable subsequent to the second brake segment, the sequential operation of the first, second, and the third brake segment operable to control a timing and a rate of brake torque for deceleration of the elevator car upon initiation of an E-stop operation after loss of power, wherein the multiple of sequentially operated brake segments operable to stop 125% of a rated load of the elevator car, two of the multiple of sequentially operated brake segments operable to stop 100% of the rated load of the elevator car.

11. A method of engaging an electromagnetic brake for an elevator system upon initiation of an E-stop operation after loss of power, comprising:

sequentially controlling a multiple of brake segments to control a timing and a rate of brake torque for deceleration of the elevator car, wherein each of the multiple of sequentially operated brake segments includes an electromagnetic coil that controls the timing and the rate of brake torque for that brake segment, the multiple of sequentially operated brake segments operable to stop 125% of a rated load of the elevator car, an N−1 number of the multiple of sequentially operated brake segments, operable to stop 100% of the rated load of the elevator car wherein N is the total number of brake segments.

12. The method as recited in claim 11, further comprising sequentially operating the multiple of brake with respect to a single brake disc.

13. The method as recited in claim 11, wherein a first brake segment of the multiple of brake segments applies a brake torque sufficient to prevent over-speed.

* * * * *